United States Patent
Li (10) Patent No.: US 11,651,496 B2
(45) Date of Patent: May 16, 2023

(54) LIVER FIBROSIS RECOGNITION METHOD BASED ON MEDICAL IMAGES AND COMPUTING DEVICE USING THEREOF

(71) Applicant: Ping An Technology (Shenzhen) Co., Ltd., Shenzhen (CN)

(72) Inventor: Bowen Li, Bethesda, MD (US)

(73) Assignee: Ping An Technology (Shenzhen) Co., Ltd., Shenzhen (CN)

(*) Notice: Subject to any disclaimer, the term of this patent is extended or adjusted under 35 U.S.C. 154(b) by 301 days.

(21) Appl. No.: 17/198,674

(22) Filed: Mar. 11, 2021

(65) Prior Publication Data
US 2022/0292683 A1 Sep. 15, 2022

(51) Int. Cl.
*G06T 7/11* (2017.01)
*G06T 3/40* (2006.01)
*G06T 3/60* (2006.01)
*G06T 7/12* (2017.01)

(52) U.S. Cl.
CPC .............. *G06T 7/11* (2017.01); *G06T 3/4046* (2013.01); *G06T 3/60* (2013.01); *G06T 7/12* (2017.01); *G06T 2207/20081* (2013.01); *G06T 2207/20084* (2013.01); *G06T 2207/20221* (2013.01); *G06T 2207/30056* (2013.01)

(58) Field of Classification Search
CPC . G06T 7/11; G06T 3/4046; G06T 3/60; G06T 7/12; G06T 2207/20081; G06T 2207/20084; G06T 2207/20221; G06T 2207/30056; G06T 7/0012; G06T 2207/10132
See application file for complete search history.

(56) References Cited

U.S. PATENT DOCUMENTS

| | | | |
|---|---|---|---|
| 10,229,488 B2* | 3/2019 | Yu | G06T 7/0012 |
| 2016/0012583 A1* | 1/2016 | Cales | G06T 7/11 382/128 |
| 2017/0215814 A1* | 8/2017 | Cales | G06T 7/0012 |
| 2021/0192722 A1* | 6/2021 | Brozek | G06T 7/0012 |
| 2021/0248741 A1* | 8/2021 | Kannengiesser | A61B 5/055 |
| 2021/0366577 A1* | 11/2021 | Koller | G16B 20/00 |

(Continued)

OTHER PUBLICATIONS

Meng, Dan, et al. "Liver fibrosis classification based on transfer learning and FCNet for ultrasound images." Ieee Access 5 (2017):5804-5810. (Year: 2017).*

(Continued)

*Primary Examiner* — Bobbak Safaipour
(74) *Attorney, Agent, or Firm* — ScienBiziP, P.C.

(57) ABSTRACT

A liver fibrosis recognition method based on medical images and a computing device using thereof obtains a plurality of first binary images by segmenting a region of interest in each of a plurality of medical images of a liver. A rectangular region is created for each first binary image, and a plurality of second binary images is obtained by generating a second binary according to each rectangular region and the first binary image. A feature map is obtained from each liver medical image and images are generated according to the second binary images and corresponding to the plurality of feature maps. A model for recognition is iteratively trained based on the plurality of final images and recognition of liver fibrosis in patients is then achievable using the model.

20 Claims, 3 Drawing Sheets

(56) References Cited

U.S. PATENT DOCUMENTS

2022/0148238 A1* 5/2022 He .................... G01S 7/52028
2023/0061998 A1* 3/2023 Yang .................... G06N 3/045

OTHER PUBLICATIONS

Hashem, Ahmed M., et al. "Prediction of the degree of liver fibrosis using different pattern recognition techniques." 2010 5th Cairo International Biomedical Engineering Conference. IEEE, 2010. (Year: 2010).*

* cited by examiner

LIVER FIBROSIS RECOGNITION METHOD BASED ON MEDICAL IMAGES AND COMPUTING DEVICE USING THEREOF

FIELD

The present disclosure relates to a technical field of digital medical technology, specifically a liver fibrosis recognition method based on medical images and a computing device using thereof.

BACKGROUND

Liver fibrosis is a major health threat with high prevalence. Without timely diagnosis and treatment, liver fibrosis can develop into liver cirrhosis and even hepatocellular carcinoma. While histopathology remains the gold standard, non-invasive approaches minimize patient discomfort and danger. Elastography is a useful non-invasive approach, but it is not always available or affordable, and it can be confounded by inflammation, presence of liver steatosis, and the patient's etiology. Assessment using conventional ultrasound may be potentially more versatile; however, it is a subjective measurement that can suffer from insufficient sensitivities, specificities, and high inter- and intra-rater variability. There is impetus for an automated and less subjective assessment of liver fibrosis.

Although a relatively understudied topic, related work has advanced automated Ultrasound fibrosis assessment. In terms of deep convolutional neural networks (CNNs), Meng et al., put forward a straightforward liver fibrosis parenchyma VGG-16-based classifier, and tested on a small dataset of 279 images. Only image-wise predictions were performed and no study-wise prediction was reported. On the other hand, Liu et al., correctly identified the value of fusing features from all ultrasound images in a study when making a prediction. However, their algorithm requires exactly 10 images. Real patient studies may contain an arbitrary number of ultrasound scans. Their concatenation of features approach also drastically increases computational and memory costs as more images are incorporated. Moreover, 13 manually labeled indicators are relied on as ancillary supervision, which are typically not available without considerable labor costs.

A solution for liver fibrosis recognition is required.

SUMMARY

A first aspect of an embodiment of the present disclosure provides a liver fibrosis recognition method based on medical images. The method includes: obtaining a plurality of first binary images by segmenting a region of interest (interest region) in each of a plurality of liver medical images; creating a rectangular region for each first binary image, and obtaining a plurality of second binary images by generating a second binary image according to each rectangular region and the corresponding first binary image; extracting a feature map of each liver medical image to obtain a plurality of feature maps; generating a plurality of input images according to the plurality of second binary images and corresponding to the plurality of feature maps; iteratively training a liver fibrosis recognition model based on the plurality of input images; and obtaining a liver fibrosis recognition result by using the liver fibrosis recognition model to recognize a liver medical image to be recognized.

A second aspect of an embodiment of the present disclosure provides a computing device, which includes: at least one processor; and a storage device storing one or more programs which when executed by the at least one processor, cause the at least one processor to: segment an interest region in each of a plurality of liver medical images and obtain a plurality of first binary images; create a rectangular region for each first binary image, and obtain a plurality of second binary images by generating a second binary image according to each rectangular region and the corresponding first binary image; extract a feature map of each liver medical image to obtain a plurality of feature maps; generate a plurality of input images according to the plurality of second binary images and corresponding to the plurality of feature maps; iteratively train a liver fibrosis recognition model based on the plurality of input images; and obtain a liver fibrosis recognition result by using the liver fibrosis recognition model to recognize a liver medical image to be recognized.

A third aspect of an embodiment of the present disclosure provides a non-transitory storage medium having stored thereon instructions that, when executed by a processor of a computing device, causes the computing device to perform a liver fibrosis recognition method, the method includes: segmenting an interest region in each of a plurality of liver medical images and obtaining a plurality of first binary images; creating a rectangular region for each first binary image, and obtaining a plurality of second binary images by generating a second binary image according to each rectangular region and the corresponding first binary image; extracting a feature map of each liver medical image to obtain a plurality of feature maps; generating a plurality of input images according to the plurality of second binary images and corresponding to the plurality of feature maps; iteratively training a liver fibrosis recognition model based on the plurality of input images; and obtaining a liver fibrosis recognition result by using the liver fibrosis recognition model to recognize a liver medical image to be recognized.

In the embodiments of the present disclosure, by avoiding a CNN overfitting on non-relevant image features (spurious or background features), the network is forced to focus on a clinical region of interest (ROI), encompassing the liver parenchyma and upper border. A global hetero-image fusion (GHIF) is introduced, which allows the CNN to fuse features from any arbitrary number of images in an Ultrasound study, increasing its versatility and flexibility. Finally, a "style"-based view-specific paranrieterization (VSP) is used to tailor the CNN processing based on the particular view of each ultrasound image based on 6 common liver ultrasound views, while keeping the majority of parameters the same across views. The result is a highly robust and practical liver fibrosis assessment solution.

DETAILED DESCRIPTION

The embodiments of the present disclosure are described with reference to the accompanying drawings. Described embodiments are merely embodiments which are a part of the present disclosure, and do not include every embodiment. All other embodiments obtained by those of ordinary skill in the art based on the embodiments of the present disclosure without creative efforts are within the scope of the claims.

Terms such as "first", "second" and the like in the specification and in the claims of the present disclosure and the above drawings are used to distinguish different objects, and are not intended to describe a specific order. Moreover, the term "include" and any variations of the term "include" are intended to indicate a non-exclusive inclusion. For example, a process, a method, a system, a product, or a device which includes a series of steps or units is not limited to steps or units which are listed, but can include steps or units which are not listed, or can include other steps or units inherent to such processes, methods, products, and equipment.

Figure 1:
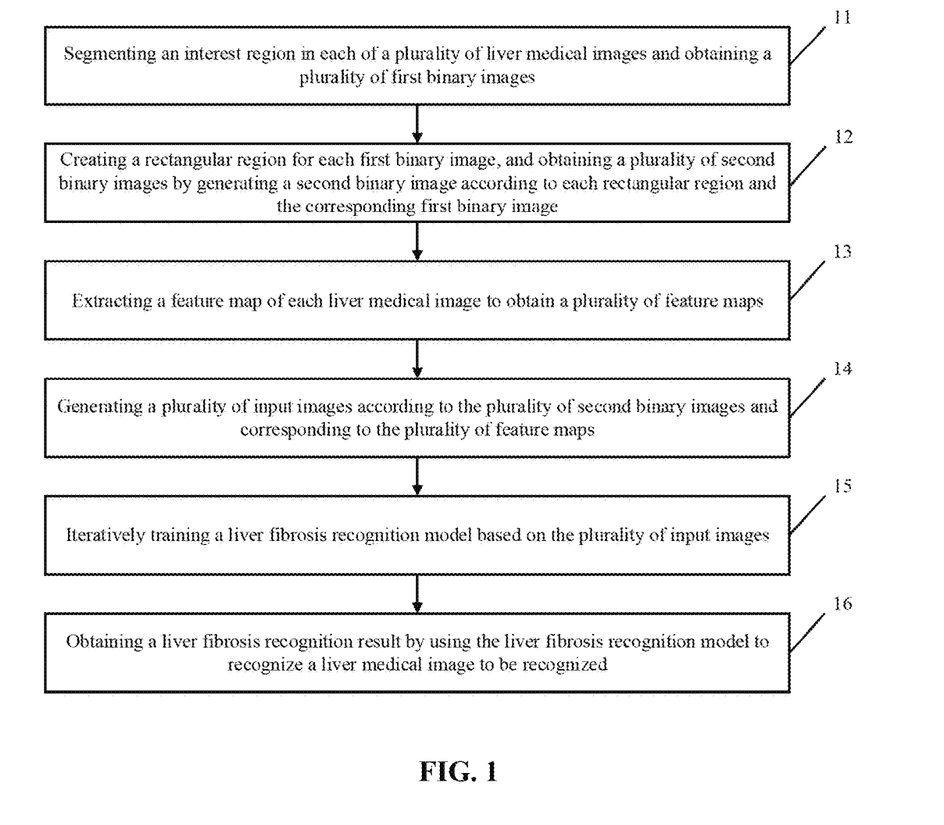
FIG. 1 shows a schematic flow chart of an embodiment of a liver fibrosis recognition method based on medical images according to the present disclosure.

FIG. 1 shows a schematic flow chart of an embodiment of a liver fibrosis recognition method based on medical images according to the present disclosure.

As shown in FIG. 1, the liver fibrosis recognition method based on medical images applicable in a computing device can include the following steps. According to different requirements, the order of the steps in the flow chart may be changed, and some may be omitted.

In block 11, segmenting an interest region in each of a plurality of liver medical images and obtaining a plurality of first binary images.

Figure 2:
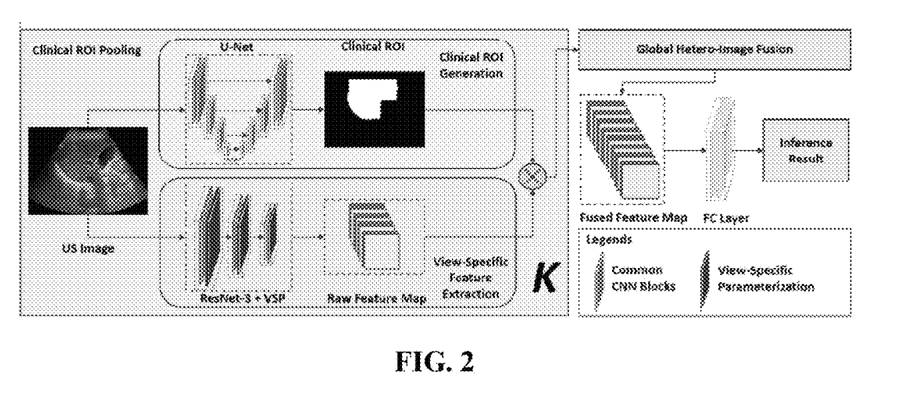
FIG. 2 shows a schematic structural diagram of a network architecture for training a liver fibrosis recognition model according to the present disclosure.

FIG. 2 is a schematic structural diagram of a network architecture for training a liver fibrosis recognition model. In some embodiments, a data set comprised of a plurality of liver medical images and ground-truth labels indicating liver fibrosis status can be constructed firstly, and then the interest region in each of the plurality of liver medical images can be segmented to obtain a plurality of first binary images. For example, 232 liver patients are scanned up to 3 times each, using each time a different scanner type of image scanning device each time. The image scanning device can be, for example, an ultrasound device, a Computed Tomography (CT) device, a Magnetic Resonance Imaging (MRI) device, a positron emission tomography (PET) device, a single photon emission computed tomography (SPECT) device, a rotational angiography device, and other medical imaging investigative devices. In order to facilitate understanding the present disclosure, the following describes an example of ultrasound images of liver patients.

Images of each liver patient are composed of up to 14 medical images and a total number of medical images of the data set is 6979. Among the 232 liver patients, 95 (40.95%) patients have moderate to severe fibrosis, 27 with severe liver steatosis, and all with hepatitis B. The data set can be denoted as $D=\{X_i, y_i\}$, wherein $i=1, \ldots, 232$, $X_i=\{X^1, \ldots, X^{K_i}\}$, $X_i$ represents $K_i$ images of an i-th liver patient, and $y_i$ represents the ground-truth labels indicating liver fibrosis status of the i-th liver patient. $y_i$ can be 1 or 0, when $y_i$ is 1, it indicates that the i-th liver patient has liver fibrosis, when $y_i$ is 0, it indicates that the i-th liver patient does not suffer from liver fibrosis.

In some embodiments, a pre-trained liver segmentation model can be used to segment the interest region in each of the plurality of liver medical images to obtain a plurality of first binary images.

The interest region refers to a region in the liver medical images where lesions can occur. An improved U-Net (deeply-supervised net) can be used to detect the interest region in each of the plurality of liver medical images, and then segment or isolate the interest region from each of the plurality of liver medical images to obtain the plurality of first binary images. Pixel values corresponding to the interest region in the first binary image are 1, and pixel values corresponding to a region that is not of interest in the first binary image are 0.

The improved U-Net enables the semantics of the intermediate feature map to be discernible at each image scale, resulting in better results than with an original U-Net. The improved U-Net is known in the prior art, and a process of segmenting the interest region using the improved. U-Net is also prior art. The present disclosure will not describe the same in detail herein.

In block 12, creating a rectangular region for each first binary image, and obtaining a plurality of second binary images by generating a second binary image according to each rectangular region and the corresponding first binary image.

Based on a priori clinical practice, certain features are crucial for recognition of liver fibrosis, e.g., a parenchyma texture and surface nodularity. As FIG. 2 demonstrates, to make the liver fibrosis recognition model focus on these certain features, a masking technique can be used. That is, obtaining a first binary image for each liver medical image, each first binary image can be a liver mask for each liver medical image. Then, for each liver medical image, a rectangular region for each first binary image can be created, and a second binary image can be generated according to each rectangular region and the corresponding first binary image, ensuring that the second binary image captures enough of the parenchyma texture and surface nodularity to extract meaningful features.

In some embodiments, the method of creating a rectangular region for each first binary image includes: determining a center point, a highest point, and a left boundary and a right boundary of the interest region in each first binary image; extending the highest point upward, by a preset number of pixels to obtain a target highest point; creating a rectangular region according to the left boundary and the right boundary of the interest region, wherein a midpoint of a lower edge of the rectangular region is the center point, and a midpoint of an upper edge of the rectangular region is the target highest point.

The rectangular region can be used to cover a top half of the liver mask (that is, to cover a top half of the interest region of the first binary image).

For example, the preset number of pixels can be 10. Extending the highest point upward by the preset number of pixels to obtain a target highest point and creating the rectangular region according to the target highest point, allows the rectangular region to cover an entire border of the liver.

In some embodiments, the method of generating the second binary image according to each rectangular region and the corresponding first binary image includes: updating pixel values corresponding to the rectangular region in the first binary image to target pixel values; and generating the second binary image according to the updated pixel values in the first binary image.

Figure 3:
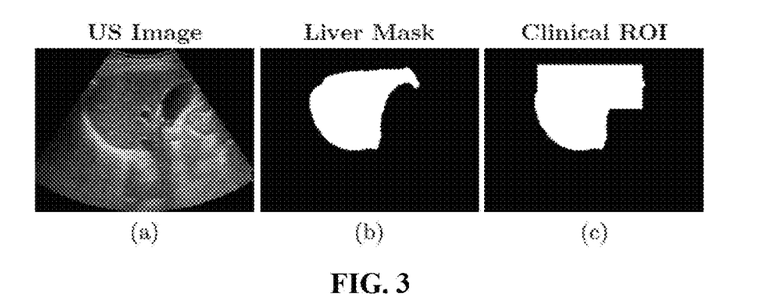
FIG. 3 shows a schematic diagram of an example of a region of interest and a rectangular box according to the present disclosure.

Referring to FIG. 3, FIG. 3(a). depicts a liver ultrasound image, whose first binary image is rendered. A white area in FIG. 3(b). corresponds to the liver mask, and FIG. 3(c). shows a generated second binary image, a white area in FIG. 3(c). is extended upward to cover the top border of a liver.

In block 13, extracting a feature map of each liver medical image to obtain a plurality of feature maps.

Each liver medical image corresponds to one feature map. A plurality of feature maps can be obtained by extracting a feature map of each liver medical image.

In fact, ultrasound views of the liver can be roughly divided into 6 categories, each of which focuses on different regions of the liver.

Figure 4:
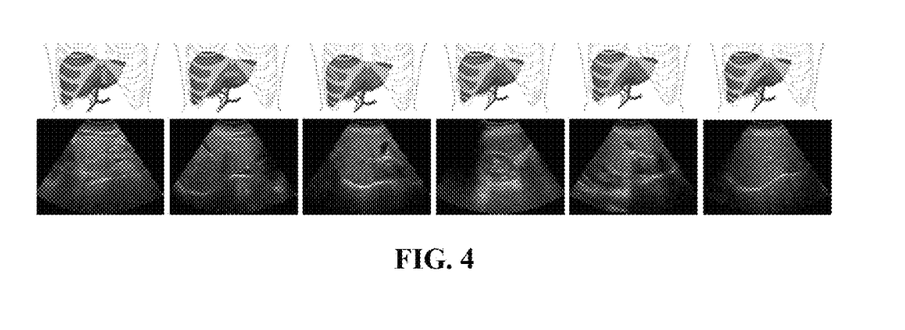
FIG. 4 shows a schematic diagram of an example of liver Ultrasound images with different image views according to the present disclosure.

Referring to FIG. 4, an example of liver Ultrasound images with different image views is shown. From left to right: left hepatic lobe, midline abdomen view; left hepatic lobe, transverse abdomen view; right hepatic lobe, intercostal view 1; right hepatic lobe, intercostal view 2; subcostal view 2; and subcostal view 2. Different manners of view-specific analysis can push performance further.

In some embodiments, a dedicated deep CNN can be trained for each view category to extract a feature map of each liver medical image corresponding to the view category. However, this drastically reduces a training set for each dedicated deep CNN and increases six-fold the number of parameters, computation load, and memory consumption.

In some embodiments, the method of obtaining the plurality of feature maps by extracting a feature map of each liver medical images includes: recognizing an image view of each liver medical image; generating a view-specific feature extracting model according to the image view of each liver medical image; and extracting a feature map of each liver medical image to obtain a plurality of feature maps using the generated view-specific feature extracting model.

A pre-trained image view recognition model can be used to recognize the image view of each liver medical image. A process of training the image view recognition model can include: obtaining a sample data set, the sample data set including a plurality of liver medical image samples, and each liver medical image sample corresponds to one image view; obtaining a training set from the sample data set; calculating a loss value of a risk loss function by inputting the training set into a convolutional neural network; when it is determined that the loss value of the risk loss function reaches a convergence state, updating parameters in an initial network framework of the convolutional neural network according to the risk loss value; and determining the initial network framework after updating the parameters as an image view recognition model.

In some embodiments, the sample data set can be obtained by scanning same part of a plurality of patients using various image scanning devices for training the convolutional neural network to obtain an image view recognition model.

Using a first ratio (e.g., 67.5%) dividing the plurality of liver medical image samples into the training set, using a second ratio (e.g., 12.5%) to divide the remaining plurality of liver medical image samples into a validation set, and using another ratio (e.g., 20%) for division into a test set. Wherein a sum of the first ratio, the second ratio and the third ratio is 1. Inputting the training set into an initial network framework of the convolutional neural network, parameters in the initial network framework need to be trained to be determined. The initial network framework of the convolutional neural network includes: a plurality of convolution layers, a plurality of pooling layers, one compression excitation layer SE, one global average merge layer, one fully connected layer, and one SoftMax output layer. The loss function in the SoftMax output layer can be a cross entropy (CE) loss function or an aggregated cross entropy (ACE) loss function. After training the convolutional neural network model, the verification set can be used to optimize parameters in the convolutional neural network model, and the test set can be used to test the performance of the convolutional neural network model.

A concept of the "style" parameters can be adapted to implement a view-specific parameterization (VSP) appropriate for ultrasound-based fibrosis recognition. Such parameters refer to the affine normalization parameters used in batch- or instance-normalization. If these parameters are switched out, keeping all other parameters constant, one can alter the behavior of the CNN dramatically. Retaining view-specific normalization parameters allows for the majority of parameters and processing to be shared across views. VSP is then realized with a minimal number of additional parameters.

Since the Ultrasound views of the liver are roughly divided into 6 categories, 6 sets of normalization parameters can be created and be denoted as $\emptyset = \{\omega_1, \omega_2, \omega_3, \omega_4, \omega_5, \omega_6\}$. Each image view corresponds to one $\omega$, and different image views correspond to different $\omega$. A fully connected neural network includes a plurality of normalization layers, and each normalization layer includes two parameters, so there are a total of 12 parameters.

After recognizing the image view of each liver medical image, the view specific feature extracting model can be generated according to the image view of each liver medical image; the plurality of feature maps can be obtained by extracting a feature map of each of the liver medical images using the generated view specific feature extracting model.

A truncated version of ResNet (only a first three layer blocks) can be used. This keeps enough spatial resolution prior to the liver mask. This truncated backbone is called "ResNet-3".

In block 14, generating a plurality of input images according to the plurality of second binary images and corresponding to the plurality of feature maps.

Each input image can be obtained by calculating a cross product of the corresponding second binary image and the corresponding feature map. It is found that including the zeroed-out regions within the global average pooling benefits performance. Their inclusion helps the implicit capture of liver size characteristics, which is another clinical ultrasound marker for liver fibrosis.

In block 15, iteratively training a liver fibrosis recognition model based on the plurality of input images.

A challenge with liver fibrosis studies is the variable number of liver medical images, each of which has a potentially different view. Ideally, all available liver medical images contribute to the final prediction. In the existing technology, a conventional approach is to aggregate individual image-view predictions, e.g., taking a median. This conventional approach has drawbacks, as it is accomplished via a late fusion of independent and image-specific predictions. But, this does not allow the CNN to integrate the combined features across ultrasound images. A better approach fuses these features. The challenge is to allow for an arbitrary number of Ultrasound images in order to ensure flexibility and practicality.

The HeMIS approach to segmentation offers a promising strategy that fuses features from arbitrary numbers of images using their first- and second-order moments. However, HeMIS fuses convolutional features early in its FCN pipeline, which is possible because it assumes pixel-to-pixel correspondence across images. ultrasound images violate this assumption. Instead, only global Ultrasound features can sensibly be fused together, which is accomplished through global hetero-image fusion (GHIF). It uses $A=\{A^k\}$ and $M=\{M^k\}$ to denote the set of FCN features and clinical interests region, respectively, for each liver medical image. Then GHIF accepts any arbitrary set of FCN features to produce a study-wise prediction:

$$\hat{y}=f(g(A;M);w),$$

$$g(A;M)=\operatorname{concat}(\operatorname{mean}(G), \operatorname{var}(G), \operatorname{mean}(G)),$$

$$G=\{\operatorname{GAP}(M^k \odot A^k)\}_{k=1}^K.$$

While GHIF can effectively integrate arbitrary numbers of Ultrasound images within a study, it uses the same FCN feature extractor across all images, treating them all identically. Yet, there are certain ultrasound features, such as vascular markers, that are specific to particular views.

In some embodiments, the method of iteratively training a liver fibrosis recognition model based on the plurality of input images includes: selecting a training data set from the plurality of input images; in each iteration of training, randomly selecting K input images from the training data set of the same liver patient; fusing the K input images to obtain a fused image; training a fully connected neural network based on a plurality of the fused images; acquiring predicted labels output by a fully connected layer of the fully connected neural network; calculating a prediction accuracy rate according to the ground-truth labels indicating liver fibrosis status and the predicted labels; determining whether the prediction accuracy rate is greater than a preset accuracy rate threshold; when the prediction accuracy rate becomes greater than the preset accuracy rate threshold, stopping the training of the fully connected neural network, to obtain the liver fibrosis recognition model.

Here, the GHIF also incorporates an operator, in addition to the first- and second-order moments, as that has a powerful hetero-fusion function which can enhance a performance of the liver fibrosis recognition model. GHIF is a new but effective process applied to global feature vectors. Rather than always inputting all liver medical images when training, an important strategy is choosing random combinations of the K liver medical images for every epoch. This provides a form of data augmentation and allows the CNN to learn from image signals that may be suppressed otherwise. Training with random combinations of images can make GHIF's batch statistics unstable and for this reason, a normalization not relying on batch statistics, such as instance-normalization, should be used.

In some embodiments, before training the liver fibrosis recognition model, the method also includes: augmenting the plurality of input images by adjusting the plurality of input images with random changes of brightness, contrast, rotations, and scale. By so adjusting the plurality of input images, a number of the plurality of input images can be expanded, thereby expanding a number of the training data set, thereby improving the generalization performance of the liver fibrosis recognition model.

In block 16, obtaining a liver fibrosis recognition result by using the liver fibrosis recognition model to recognize a liver medical image to be recognized.

The liver medical image to be recognized is inputted into the liver fibrosis recognition model. The liver fibrosis recognition model outputs a liver fibrosis recognition result after recognizing a liver medical image to be recognized. The liver fibrosis recognition result can be either healthy or liver fibrosis.

First, to avoid a CNN overfitting on non-relevant image features (spurious or background features), the neural network is forced to focus on a clinical region of interest (ROI), encompassing the liver parenchyma and upper border. Second, by introducing global hetero-image fusion (GHIF), the neural network is capable to fuse features from any arbitrary number of images in an Ultrasound study, increasing its versatility and flexibility. Finally, "style"-based view-specific parameterization (VSP) is applied to tailor the CNN processing based on the particular view of each ultrasound image based on 6 common liver ultrasound views, while keeping the majority of parameters the same across views. The result is a highly robust and practical liver fibrosis assessment solution. Experiments on a dataset of 610 Ultrasound patient studies (6979 images) demonstrate that our pipeline contributes roughly 7% and 22% improvements over conventional classifiers in partial area under the curve and recall at 90% precision respectively, validating our approach to this crucial problem.

Figure 5:
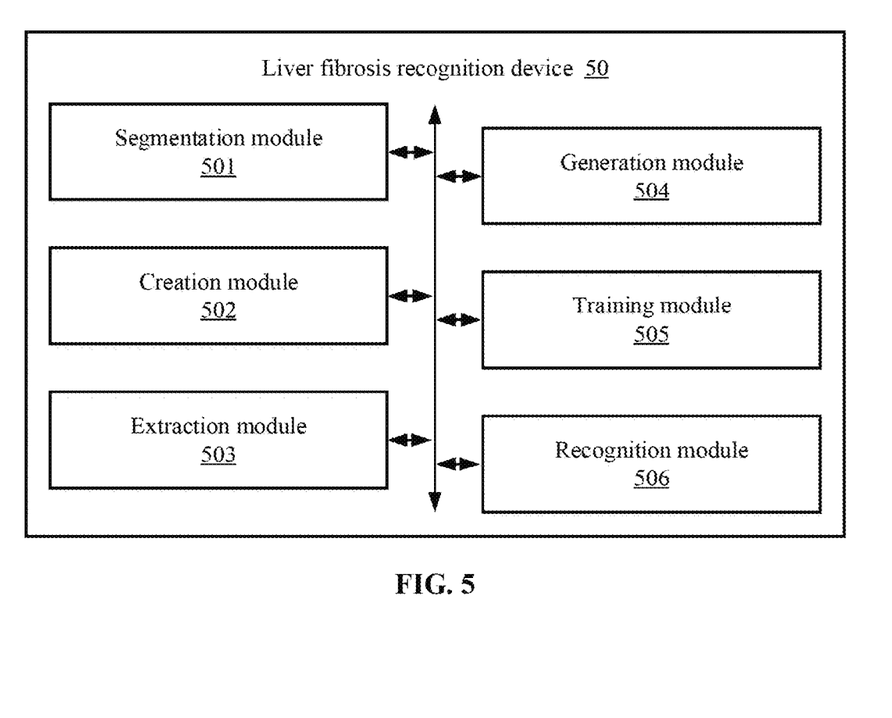
FIG. 5 shows a schematic structural diagram of an embodiment of a liver fibrosis recognition device based on medical images according to the present disclosure.

FIG. 5 shows a schematic structural diagram of an embodiment of a liver fibrosis recognition device according to the present disclosure.

In some embodiments, the liver fibrosis recognition device 50 can include a plurality of function modules consisting of program code segments. The program code of each program code segments in the device for the liver fibrosis recognition device 50 may be stored in a memory of a computing device and executed by the at least one processor to perform (described in detail in FIG. 1) a function of processing a medical image.

In an embodiment, the liver fibrosis recognition device 50 can be divided into a plurality of functional modules, according to the performed functions. The functional module can include: a segmentation module 501, a creation module 502, an extraction module 503, a generation module 504, a training module 505, and a recognition module 506. A module as referred to in the present disclosure refers to a series of computer program segments that can be executed by at least one processor and that are capable of performing fixed functions, which are stored in a memory. In this embodiment, the functions of each module will be detailed in the following embodiments.

The segmentation module 501 is configured to segment an interest region in each of a plurality of liver medical images and obtain a plurality of first binary images.

FIG. 2 is a schematic structural diagram of a network architecture for training a liver fibrosis recognition model. In some embodiments, a data set comprised of a plurality of liver medical images and ground-truth labels indicating liver fibrosis status can be constructed firstly, and then the interest region in each of the plurality of liver medical images can be segmented to obtain a plurality of first binary images. For example, 232 liver patients are scanned up to 3 times each, using each time a different scanner type of image scanning device each time. The image scanning device can be, for example, an ultrasound device, a Computed Tomography (CT) device, a Magnetic Resonance Imaging (MRI) device, a positron emission tomography (PET) device, a single photon emission computed tomography (SPECT) device, a rotational angiography device, and other medical imaging investigative devices. In order to facilitate understanding the present disclosure, the following describes an example of ultrasound images of liver patients.

Images of each liver patient are composed of up to 14 medical images and a total number of medical images of the data set is 6979. Among the 232 liver patients, 95 (40.95%) patients have moderate to severe fibrosis, 27 with severe liver steatosis, and all with hepatitis B. The data set can be denoted as $D=\{X_i, y_j\}$, wherein i=1, . . . , 232, $X_i=\{X^1, \ldots, X^{K_i}\}$, $X_i$ represents $K_i$ images of an i-th liver patient, and $y_i$ represents the ground-truth labels indicating liver fibrosis status of the i-th liver patient. $y_i$ can be 1 or 0, when $y_1$ is 1, it indicates that the i-th liver patient has liver fibrosis, when $y_i$ is 0, it indicates that the i-th liver patient does not suffer from liver fibrosis.

In some embodiments, a pre-trained liver segmentation model can be used to segment the interest region in each of the plurality of liver medical images to obtain a plurality of first binary images.

The interest region refers to a region in the liver medical images where lesions can occur. An improved U-Net (deeply-supervised net) can be used to detect the interest region in each of the plurality of liver medical images, and then segment or isolate the interest region from each of the plurality of liver medical images to obtain the plurality of first binary images. Pixel values corresponding to the interest region in the first binary image are 1, and pixel values corresponding to a region that is not of interest in the first binary image are 0.

The improved U-Net enables the semantics of the intermediate feature map to be discernible at each image scale, resulting in better results than with an original U-Net. The improved U-Net is known in the prior art, and a process of segmenting the interest region using the improved U-Net is also prior art. The present disclosure will not describe the same in detail herein.

The creation module 502 is configured to create a rectangular region for each first binary image, and obtain a plurality of second binary images by generating a second binary image according to each rectangular region and the corresponding first binary image.

Based on a priori clinical practice, certain features are crucial for recognition of liver fibrosis, e.g., a parenchyma texture and surface nodularity. As FIG. 2 demonstrates, to make the liver fibrosis recognition model focus on these certain features, a masking technique can be used. That is, obtaining a first binary image for each liver medical image, each first binary image can be a liver mask for each liver medical image. Then, for each liver medical image, a rectangular region for each first binary image can be created, and a second binary image can be generated according to each rectangular region and the corresponding first binary image, ensuring that the second binary image captures enough of the parenchyma texture and surface nodularity to extract meaningful features.

In some embodiments, the process of the creation module 502 creating a rectangular region for each first binary image includes: determining a center point, a highest point, and a left boundary and a right boundary of the interest region in each first binary image; extending the highest point upward by a preset number of pixels to obtain a target highest point; creating a rectangular region according to the left boundary and the right boundary of the interest region, wherein a midpoint of a lower edge of the rectangular region is the center point, and a midpoint of an upper edge of the rectangular region is the target highest point.

The rectangular region can be used to cover a top half of the liver mask (that is, to cover a top half of the interest region of the first binary image).

For example, the preset number of pixels can be 10. Extending the highest point upward by the preset number of pixels to obtain a target highest point and creating the rectangular region according to the target highest point, allows the rectangular region to cover an entire border of the liver.

In some embodiments, the process of the creation module 502 generating the second binary image according to each rectangular region and the corresponding first binary image includes: updating pixel values corresponding to the rectangular region in the first binary image to target pixel values; and generating the second binary image according to the updated pixel values in the first binary image.

Referring to FIG. 3, FIG. 3(*a*). depicts a liver ultrasound image, whose first binary image is rendered. A white area in FIG. 3(*b*). corresponds to the liver mask, and FIG. 3(*c*). shows a generated second binary image, a white area in FIG. 3(*c*). is extended upward to cover the top border of a liver.

the extraction module 503 is configured to extract a feature map of each liver medical image to obtain a plurality of feature maps.

Each liver medical image corresponds to one feature map. A plurality of feature maps can be obtained by extracting a feature map of each liver medical image.

In fact, ultrasound views of the liver can be roughly divided into 6 categories, which focus on different regions of the liver.

Referring to FIG. 4, an example of liver Ultrasound images with different image views is shown. From left to right: left hepatic lobe, midline abdomen view; left hepatic lobe, transverse abdomen view; right hepatic lobe, intercostal view 1; right hepatic lobe, intercostal view 2; subcostal view 2; and subcostal view 2. Different manners of view-specific analysis can help push performance further.

In some embodiments, a dedicated deep CNN can be trained for each view category to extract a feature map of each liver medical image corresponding to the view category. However, this drastically reduces a training set for each dedicated deep CNN and increases six-fold the number of parameters, computation, and memory consumption.

In some embodiments, in obtaining the plurality of feature maps by extracting a feature map of each liver medical image, the extraction module 503 can: recognize an image view of each liver medical image; generate a view-specific feature extracting model according to the image view of each liver medical image; and extract a feature map of each liver medical image to obtain a plurality of feature maps using the generated view-specific feature extracting model.

A pre-trained image view recognition model can be used to recognize the image view of each liver medical image. A process of training the image view recognition model can include: obtaining a sample data set, the sample data set including a plurality of liver medical image samples, and each liver medical image sample corresponds to one image view; obtaining a training set from the sample data set; calculating a loss value of a risk loss function by inputting the training set into a convolutional neural network; when it is determined that the loss value of the risk loss function reaches a convergence state, updating parameters in an initial network framework of the convolutional neural network according to the risk loss value; and determining the initial network framework after updating the parameters as an image view recognition model.

In some embodiments, the sample data set can be obtained by scanning a same part of a plurality of patients using various image scanning devices for training the convolutional neural network to obtain an image view recognition model.

Using a first ratio (e.g., 67.5%) to divide the plurality of liver medical image samples into the training set, using a second ratio (e.g., 12.5%) to divide the remaining plurality of liver medical image samples into a validation set, and using another ratio (e.g., 20%) for division into a test set. Wherein a sum of the first ratio, the second ratio and the third ratio is 1. Inputting the training set into an initial network framework of the convolutional neural network, parameters in the initial network framework need to be trained to be determined. The initial network framework of the convolutional neural network includes: a plurality of convolution layers, a plurality of pooling layers, one compression excitation layer SE, one global average merge layer, one fully connected layer, and one SoftMax output layer. The loss function in the SoftMax output layer can be a cross entropy (CE) loss function or an aggregated cross entropy (ACE) loss function. After training the convolutional neural network model, the verification set can be used to optimize parameters in the convolutional neural network model, and the test set can be used to test the performance of the convolutional neural network model.

A concept of the "style" parameters can be adapted to implement a view-specific parameterization (VSP) appropriate for ultrasound-based fibrosis recognition. Such parameters refer to the affine normalization parameters used in batch- or instance-normalization. If these parameters are switched out, keeping all other parameters constant, one can alter the behavior of the CNN dramatically. Retaining view-specific normalization parameters allows for the majority of parameters and processing to be shared across views. VSP is then realized with a minimal number of additional parameters.

Since the Ultrasound views of the liver are roughly divided into 6 categories, 6 sets of normalization parameters can be created and be denoted as $\emptyset=\{\omega 1, \omega 2, \omega 3, \omega 4, \omega 5, \omega 6\}$. Each image view corresponds to one $\omega$, and different image views correspond to different $\omega$. A fully connected neural network includes a plurality of normalization layers, and each normalization layer includes two parameters, so, there are a total of 12 parameters.

After recognizing the image view of each liver medical image, the view specific feature extracting model can be generated according to the image view of each liver medical image; the plurality of feature maps can be obtained by extracting a feature map of each of the liver medical images using the generated view specific feature extracting model.

A truncated version of ResNet (only a first three layer blocks) can be used. This keeps enough spatial resolution prior to the liver mask. This truncated backbone is called "ResNet-3".

The generation module 504 is configured to generate a plurality of input images according to the plurality of second binary images and corresponding to the plurality of feature maps.

Each input image can be obtained by calculating a cross product of the corresponding second binary image and the corresponding feature map. It is found that including the zeroed-out regions within the global average pooling benefits performance. Their inclusion helps the implicit capture of liver size characteristics, which is another clinical ultrasound marker for liver fibrosis.

The training module 505 is configured to iteratively train liver fibrosis recognition model based on the plurality of input images.

A challenge with liver fibrosis studies is the variable number of liver medical images, each of which has a potentially different view. Ideally, all available liver medical images contribute to the final prediction. In the existing technology, a conventional approach is to aggregate individual image-view predictions, e.g., taking a median. This conventional approach has drawbacks, as it is accomplished via a late fusion of independent and image-specific predictions. But, this does not allow the CNN to integrate the combined features across ultrasound images. A better approach fuses these features. The challenge is to allow for an arbitrary number of Ultrasound images in order to ensure flexibility and practicality.

The HeMIS approach to segmentation offers a promising strategy that fuses features from arbitrary numbers of images using their first- and second-order moments. However, HeMIS fuses convolutional features early in its FCN pipeline, which is possible because it assumes pixel-to-pixel correspondence across images. ultrasound images violate this assumption. Instead, only global Ultrasound features can sensibly be fused together, which is accomplished through global hetero-image fusion (GHIF). It uses $A=\{A^k\}$ and $M=\{M^k\}$ to denote the set of FCN features and clinical interests region, respectively, for each liver medical image. Then GHIF accepts any arbitrary set of FCN features to produce a study-wise prediction:

$$\hat{y}=f(g(A;M);w),$$

$$g(A;M)=\text{concat}(\text{mean}(G), \text{var}(G), \text{mean}(G)),$$

$$G=\{\text{GAP}(M^k \odot A^k)\}_{k=1}^{K}.$$

While GHIF can effectively integrate arbitrary numbers of Ultrasound images within a study, it uses the same FCN feature extractor across all images, treating them all identically. Yet, there are certain ultrasound features, such as vascular markers, that are specific to particular views.

In some embodiments, the training module 505 iteratively training a liver fibrosis recognition model based on the plurality of input images includes: selecting a training data set from the plurality of input images; in each iteration of training, randomly selecting K input images from the training data set of the same liver patient; fusing the K input images to obtain a fused image; training a fully connected neural network based on a plurality of the fused images; acquiring predicted labels output by a fully connected layer of the fully connected neural network; calculating a prediction accuracy rate according to the ground-truth labels indicating liver fibrosis status and the predicted labels; determining whether the prediction accuracy rate is greater than a preset accuracy rate threshold; when the prediction accuracy rate becomes greater than the preset accuracy rate threshold, stopping the training of the fully connected neural network, to obtain the liver fibrosis recognition model.

Here, the GHIF also incorporates an operator, in addition to the first- and second-order moments, as that has a powerful hetero-fusion function which can enhance a performance of the liver fibrosis recognition model. GHIF is a new but effective process applied to global feature vectors. Rather than always inputting all liver medical images when training, an important strategy is choosing random combinations of the K liver medical images for every epoch. This provides a form of data augmentation and allows the CNN to learn from image signals that may be suppressed otherwise. Training with random combinations of images can make GHIF's batch statistics unstable and for this reason, a normalization not relying on batch statistics, such as instance-normalization, should be used.

In some embodiments, before training the liver fibrosis recognition model, the training module 505 also configured to: augment the plurality of input images by adjusting the plurality of input images with random changes of brightness, contrast, rotations, and scale. By adjusting the plurality of input images, a number of the plurality of input images can be expanded, thereby expanding a number of the training data set, thereby improving the generalization performance of the liver fibrosis recognition model.

The recognition module 506 is configured to obtain a liver fibrosis recognition result by using the liver fibrosis recognition model to recognize a liver medical image to be recognized.

The liver medical image to be recognized is inputted into the liver fibrosis recognition model. The liver fibrosis recognition model outputs a liver fibrosis recognition result after recognizing a liver medical image to be recognized. The liver fibrosis recognition result can be healthy or liver fibrosis.

First, to avoid, a CNN overfitting on non-relevant image features (spurious or background features), the neural network is forced to focus on a clinical region of interest (ROI), encompassing the liver parenchyma and upper border. Second, by introducing global hetero-image fusion (GHIF), the neural network is capable to fuse features from any arbitrary number of images in an Ultrasound study, increasing its versatility and flexibility. Finally, "style"-based view-specific parameterization (VSP) is applied to tailor the CNN processing based on the particular view of each ultrasound image based on 6 common liver ultrasound views, while keeping the majority of parameters the same across views. The result is a highly robust and practical liver fibrosis assessment solution. Experiments on a dataset of 610 Ultrasound patient studies (6979 images) demonstrate that our pipeline contributes roughly 7% and 22% improvements over conventional classifiers in partial area under the curve and recall at 90% precision respectively, validating our approach to this crucial problem.

Figure 6:
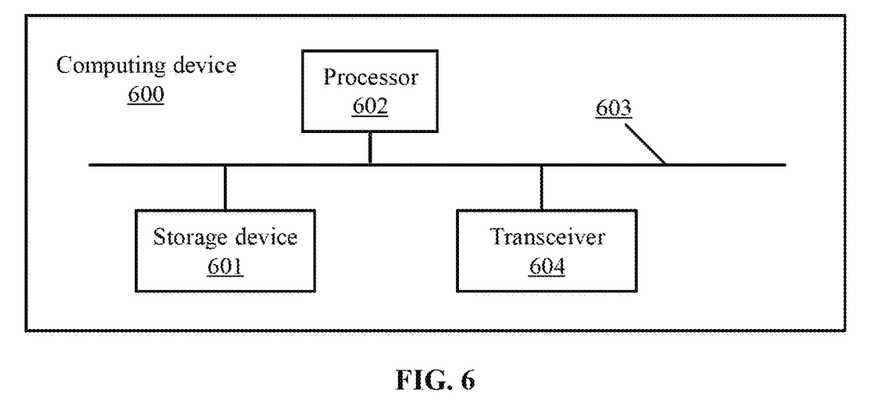
FIG. 6 shows a schematic structural diagram of a computing device applying the method of FIG. 1 according to the present disclosure.

FIG. 6 shows a schematic structural diagram of a computing device according to an embodiment of the present disclosure.

As shown in FIG. 6, the computing device 600 may include: at least one storage device 601, at least one processor 602, at least one communication bus 603, and a transceiver 604.

It should be understood by those skilled in the art that the structure of the computing device 600 shown in FIG. 6 does not constitute a limitation of the embodiment of the present disclosure. The computing device 600 may be a bus type structure or a star type structure, and the computing device 600 may also include more or less hardware or software than illustrated, or may have different component arrangements.

In at least one embodiment, the computing device 600 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 600 may further include an electronic device. The electronic device can interact with a user through a keyboard, a mouse, a remote controller, a touch panel or a voice control device, for example, an individual computers, tablets, smartphones, digital cameras, etc.

It should be noted that the computing device 600 is merely an example, and other existing or future electronic products may be included in the scope of the present disclosure, and are included in the reference.

In some embodiments, the storage device 601 can be used to store program codes of computer readable programs and various data, such as the device for automatically delineating a clinical target volume of esophageal cancer 30 installed in the computing device 600, and automatically access to the programs or data with high speed during running of the computing device 600. The storage device 601 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 600 that can be used to carry or store data.

In some embodiments, the at least one processor 602 may be composed of an integrated circuit, for example, may be composed of a single packaged integrated circuit, or may be composed of a plurality of integrated circuits of same function or different functions. The at least one processor 602 can include one or more central processing units (CPU), a microprocessor, a digital processing chip, a graphics processor, and various control chips. The at least one processor 602 is a control unit of the computing device 600, which connects various components of the computing device 600 using various interfaces and lines. By running or executing a computer program or modules stored in the storage device 601, and by invoking the data stored in the storage device 601, the at least one processor 602 can perform various functions of the computing device 600 and process data of the computing device 600.

In some embodiments, the least one bus 603 is used to achieve communication between the storage device 601 and the at least one processor 602, and other components of the computing device 600.

Although it is not shown, the computing device 600 may further include a power supply (such as a battery) for powering various components. In some embodiments, the power supply may be logically connected to the at least one processor 602 through a power management device, thereby, the power management device manages functions such as charging, discharging, and power management. The power supply may include one or more a DC or AC power source, a recharging device, a power failure detection circuit, a power converter or inverter, a power status indicator, and the like. The computing device 600 may further include various sensors, such as a BLUETOOTH module, a Wi-Fi module, and the like, and details are not described herein.

It should be understood that the described embodiments are for illustrative purposes only and are not limited by the scope of the present disclosure.

The above-described integrated unit implemented in a form of software function modules can be stored in a computer readable storage medium. The above software function modules are stored in a storage medium, and includes a plurality of instructions for causing a computing device (which may be a personal computer, or a network device, etc.) or a processor to execute the method according to various embodiments of the present disclosure.

In a further embodiment, in conjunction with FIG. 1, the at least one processor 602 can execute an operating device and various types of applications (such as the liver fibrosis recognition device 50) installed in the computing device 600, program codes, and the like. For example, the at least one processor 602 can execute the modules 501-505.

In at least one embodiment, the storage device 601 stores program codes. The at least one processor 602 can invoke the program codes stored in the storage device 601 to perform related functions. For example, the modules described in FIG. 5 are program codes stored in the storage device 601 and executed by the at least one processor 602, to implement the functions of the various modules.

In at least one embodiment, the storage device 601 stores a plurality of instructions that are executed by the at least one processor 602 to implement all or part of the steps of the method described in the embodiments of the present disclosure.

Specifically, the storage device 601 stores the plurality of instructions which when executed by the at least one processor 602, causes the at least one processor 602 to: segment an interest region in each of a plurality of liver medical images and obtain a plurality of first binary images; create a rectangular region for each first binary image, and obtain a plurality of second binary images by generating a second binary image according to each rectangular region and the corresponding first binary image; extract a feature map of each liver medical image to obtain a plurality of feature maps; generate a plurality of input images according to the plurality of second binary images and corresponding to the plurality of feature maps; iteratively train a liver fibrosis recognition model based on the plurality of input images; and obtain a liver fibrosis recognition result by using the liver fibrosis recognition model to recognize a liver medical image to be recognized.

The embodiment of the present disclosure further provides a computer storage medium, and the computer storage medium store a program that performs all or part of the steps including any of the method described in the above embodiments.

A non-transitory storage medium having stored thereon instructions that, when executed by a processor of a computing device, causes the computing device to perform an liver fibrosis recognition method, the method comprising: segmenting an interest region in each of a plurality of liver medical images and obtaining, a plurality of first binary images; creating a rectangular region for each first binary image, and obtaining a plurality of second binary images by generating a second binary image according to each rectangular region and the corresponding first binary image; extracting a feature map of each liver medical image to obtain a plurality of feature maps; generating a plurality of input images according to the plurality of second binary images and corresponding to the plurality of feature maps; iteratively training a liver fibrosis recognition model based on the plurality of input images; and obtaining a liver fibrosis recognition result by using the liver fibrosis recognition model to recognize a liver medical image to be recognized.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

In several embodiments provided in the preset application, it should be understood that the disclosed apparatus can be implemented in other ways. For example, the device embodiments described above are merely illustrative. For example, divisions of the unit are only a logical function division, and there can be other division ways in actual implementation.

The modules described as separate components may or may not be physically separated, and the components displayed as modules may or may not be physical units. That is, it can locate in one place, or distribute to a plurality of network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any reference signs in the claims should not be construed as limiting the claim.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the corresponding technical solutions from the scope of the technical solutions of the embodiments of the present disclosure.

What is claimed is:

1. A liver fibrosis recognition method based on medical images applicable in a computing device, the method comprising:
    segmenting an interest region in each of a plurality of liver medical images and obtaining a plurality of first binary images;
    creating a rectangular region for each first binary image, and obtaining a plurality of second binary images by generating a second binary image according to each rectangular region and the corresponding first binary image;
    extracting a feature map of each liver medical image to obtain a plurality of feature maps;

generating a plurality of input images according to the plurality of second binary images and corresponding to the plurality of feature maps;

iteratively training a liver fibrosis recognition model based on the plurality of input images; and obtaining a liver fibrosis recognition result by using the liver fibrosis recognition model to recognize a liver medical image to be recognized.

2. The liver fibrosis recognition method of claim 1, the method of creating a rectangular region for each first binary image comprising:

determining a center point, a highest point, and a left boundary and a right boundary of the interest region in each first binary image;

extending the highest point upward by a preset number of pixels to obtain a target highest point;

creating a rectangular region according to the left boundary and the right boundary of the interest region, wherein a midpoint of a lower edge of the rectangular region is the center point, and a midpoint of an upper edge of the rectangular region is the target highest point.

3. The liver fibrosis recognition method of claim 2, the method of generating the second binary image according to each rectangular region and the corresponding first binary image comprising:

updating pixel values corresponding to the rectangular region in the first binary image to a target pixel values; and generating the second binary image according to the updated pixel values in the first binary image.

4. The liver fibrosis recognition method of claim 3, the method of obtaining the plurality of feature maps by extracting a feature map of each liver medical images comprising:

recognizing an image view of each liver medical image; generating a view specific feature extracting model according to the image view of each liver medical image; and extracting a feature map of each liver medical image to obtain a plurality of feature maps using the generated view specific feature extracting model.

5. The liver fibrosis recognition method of claim 4, the method of iteratively training a liver fibrosis recognition model based on the plurality of input images comprising:

selecting a training data set from the plurality of input images;

in each iteration of training, randomly selecting K input images from the training data set of the same liver patient;

fusing the K input images to obtain a fused image; training a fully connected neural network based on a plurality of the fused images;

acquiring predicted labels output by a fully connected layer of the fully connected neural network;

calculating a prediction accuracy rate according to the ground-truth labels indicating liver fibrosis status and the predicted labels;

determining whether the prediction accuracy rate is greater than a preset accuracy rate threshold;

when the prediction accuracy rate is greater than the preset accuracy rate threshold, stopping the training of the fully connected neural network, to obtain the liver fibrosis recognition model.

6. The liver fibrosis recognition method of claim 5, before training the liver fibrosis recognition model, further comprising:

augmenting the plurality of input images by adjusting the plurality of input images with random changes of brightness, contrast, rotations, and scale.

7. The liver fibrosis recognition method of claim 5, each of the plurality of input images being generated by calculating a cross product of the corresponding second binary image and the corresponding feature map.

8. A computing device, comprising:

at least one processor; and a storage device storing one or more programs which when executed by the at least one processor, causes the at least one processor to:

segment an interest region in each of a plurality of liver medical images and obtain a plurality of first binary images;

create a rectangular region for each first binary image, and obtain a plurality of second binary images by generating a second binary image according to each rectangular region and the corresponding first binary image;

extract a feature map of each liver medical image to obtain a plurality of feature maps;

generate a plurality of input images according to the plurality of second binary images and corresponding to the plurality of feature maps;

iteratively train a liver fibrosis recognition model based on the plurality of input images;

obtain a liver fibrosis recognition result by using the liver fibrosis recognition model to recognize a liver medical image to be recognized.

9. The computing device of claim 8, wherein the at least one processor creating a rectangular region for each first binary image comprises:

determining a center point, a highest point, and a left boundary and a right boundary of the interest region in each first binary image;

extending the highest point upward by a preset number of pixels to obtain a target highest point;

creating a rectangular region according to the left boundary and the right boundary of the interest region, wherein a midpoint of a lower edge of the rectangular region is the center point, and a midpoint of an upper edge of the rectangular region is the target highest point.

10. The computing device of claim 9, wherein the at least one processor generating the second binary image according to each rectangular region and the corresponding first binary image comprises:

updating pixel values corresponding to the rectangular region in the first binary image to a target pixel values; and generating the second binary image according to the updated pixel values in the first binary image.

11. The computing device of claim 10, wherein the at least one processor obtaining the plurality of feature maps by extracting a feature map of each liver medical images comprises:

recognizing an image view of each liver medical image; generating a view specific feature extracting model according to the image view of each liver medical image; and extracting a feature map of each liver medical image to obtain a plurality of feature maps using the generated view specific feature extracting model.

12. The computing device of claim 11, wherein the at least one processor iteratively training a liver fibrosis recognition model based on the plurality of input images comprises:
    selecting a training data set from the plurality of input images;
    in each iteration of training, randomly selecting K input images from the training data set of the same liver patient;
    fusing the K input images to obtain a fused image; training a fully connected neural network based on a plurality of the fused images;
    acquiring predicted labels output by a fully connected layer of the fully connected neural network;
    calculating a prediction accuracy rate according to the ground-truth labels indicating liver fibrosis status and the predicted labels;
    determining whether the prediction accuracy rate is greater than a preset accuracy rate threshold;
    when the prediction accuracy rate is greater than the preset accuracy rate threshold, stopping the training of the fully connected neural network, to obtain the liver fibrosis recognition model.

13. The computing device of claim 12, before training the liver fibrosis recognition model, the at least one processor is further caused to:
    augment the plurality of input images by adjusting the plurality of input images with random changes of brightness, contrast, rotations, and scale.

14. The computing device of claim 13, each of the plurality of input images being generated by calculating a cross product of the corresponding second binary image and the corresponding feature map.

15. A non-transitory storage medium having stored thereon instructions that, when executed by a processor of a computing device, causes the computing device to perform a liver fibrosis recognition method based on medical images, the method comprising:
    segmenting an interest region in each of a plurality of liver medical images and obtaining a plurality of first binary images;
    creating a rectangular region for each first binary image, and obtaining a plurality of second binary images by generating a second binary image according to each rectangular region and the corresponding first binary image;
    extracting a feature map of each liver medical image to obtain a plurality of feature maps;
    generating a plurality of input images according to the plurality of second binary images and corresponding to the plurality of feature maps;
    iteratively training a liver fibrosis recognition model based on the plurality of input images,
    obtaining a liver fibrosis recognition result by using the liver fibrosis recognition model to recognize a liver medical image to be recognized.

16. The non-transitory storage medium of claim 15, the method of creating a rectangular region for each first binary image comprising:
    determining a center point, a highest point, and a left boundary and a right boundary of the interest region in each first binary image;
    extending the highest point upward by a preset number of pixels to obtain a target highest point;
    creating a rectangular region according to the left boundary and the right boundary of the interest region, wherein a midpoint of a lower edge of the rectangular region is the center point, and a midpoint of an upper edge of the rectangular region is the target highest point.

17. The non-transitory storage medium of claim 16, the method of generating the second binary image according to each rectangular region and the corresponding first binary image comprising:
    updating pixel values corresponding to the rectangular region in the first binary image to a target pixel values; and
    generating the second binary image according to the updated pixel values in the first binary image.

18. The non-transitory storage medium of claim 17, the method of obtaining the plurality of feature maps by extracting a feature map of each liver medical images comprising:
    recognizing an image view of each liver medical image; generating a view specific feature extracting model according to the image view of each liver medical image; and
    extracting a feature map of each liver medical image to obtain a plurality of feature maps using the generated view specific feature extracting model.

19. The non-transitory storage medium of claim 18, the method of iteratively training a liver fibrosis recognition model based on the plurality of input images comprising:
    selecting a training data set from the plurality of input images;
    in each iteration of training, randomly selecting K input images from the training data set of the same liver patient;
    fusing the K input images to obtain a fused image; training a fully connected neural network based on a plurality of the fused images;
    acquiring predicted labels output by a fully connected layer of the fully connected neural network;
    calculating a prediction accuracy rate according to the ground-truth labels indicating liver fibrosis status and the predicted labels;
    determining whether the prediction accuracy rate is greater than a preset accuracy rate threshold;
    when the prediction accuracy rate is greater than the preset accuracy rate threshold, stopping the training of the fully connected neural network, to obtain the liver fibrosis recognition model.

20. The non-transitory storage medium of claim 19, before training the liver fibrosis recognition model, the method further comprising:
    augmenting the plurality of input images by adjusting the plurality of input images with random changes of brightness, contrast, rotations, and scale.

* * * * *